(12) United States Patent
Schulze et al.

(10) Patent No.: US 8,978,505 B2
(45) Date of Patent: Mar. 17, 2015

(54) SHIFT FORK

(75) Inventors: Bernd Schulze, Niederdorf (DE); Wofram Mulitze, Oberursel (DE)

(73) Assignee: Koki Technik Transmission Systems GmbH, Niederwuerschnitz (DE)

( * ) Notice: Subject to any disclaimer, the term of this patent is extended or adjusted under 35 U.S.C. 154(b) by 651 days.

(21) Appl. No.: 13/141,098

(22) PCT Filed: Nov. 16, 2009

(86) PCT No.: PCT/EP2009/008144
§ 371 (c)(1),
(2), (4) Date: Sep. 8, 2011

(87) PCT Pub. No.: WO2010/072287
PCT Pub. Date: Jul. 1, 2010

(65) Prior Publication Data
US 2011/0314948 A1 Dec. 29, 2011

(30) Foreign Application Priority Data
Dec. 22, 2008 (DE) .......................... 10 2008 064 221

(51) Int. Cl.
*F16H 63/32* (2006.01)
(52) U.S. Cl.
CPC .................................... *F16H 63/32* (2013.01)
USPC ....................................................... 74/473.37
(58) Field of Classification Search
USPC ......................................... 74/473.37, 473.36
See application file for complete search history.

(56) References Cited

U.S. PATENT DOCUMENTS

| | | | | | |
|---|---|---|---|---|---|
| 3,729,822 | A | * | 5/1973 | Batson | 30/394 |
| 4,319,496 | A | * | 3/1982 | Yanaga | 74/473.37 |
| 4,592,144 | A | * | 6/1986 | Tolbert et al. | 30/394 |
| 4,739,850 | A | * | 4/1988 | Fujioka | 180/19.3 |
| 4,823,686 | A | * | 4/1989 | Fleissner | 100/26 |
| 4,873,884 | A | * | 10/1989 | Yamada et al. | 74/473.36 |
| 5,800,200 | A | * | 9/1998 | Brioaud et al. | 439/404 |
| 5,975,217 | A | * | 11/1999 | Frenzel et al. | 173/201 |
| 6,003,852 | A | * | 12/1999 | Kawamura | 269/287 |
| 6,186,709 | B1 | * | 2/2001 | Hsu | 408/241 R |
| 6,216,550 | B1 | * | 4/2001 | Schwuger et al. | 74/339 |
| 7,454,942 | B2 | * | 11/2008 | Schulze | 72/370.22 |
| 7,487,696 | B2 | * | 2/2009 | Tagami | 74/665 F |
| 8,382,653 | B2 | * | 2/2013 | Dubi et al. | 600/37 |
| 8,393,241 | B2 | * | 3/2013 | Akkerman et al. | 74/473.36 |
| 8,397,599 | B2 | * | 3/2013 | Ungerathen | 74/473.36 |
| 2003/0094057 | A1 | * | 5/2003 | Bigi | 74/473.37 |
| 2007/0179591 | A1 | * | 8/2007 | Baker et al. | 623/1.23 |
| 2008/0169111 | A1 | | 7/2008 | Duesselberg et al. | |
| 2013/0233113 | A1 | * | 9/2013 | Saitoh, Tetsushi | 74/473.36 |
| 2013/0247706 | A1 | * | 9/2013 | Duerr, Thomas | 74/473.36 |

FOREIGN PATENT DOCUMENTS

| | | |
|---|---|---|
| DE | 19601623 | 7/1997 |
| DE | 10018850 | 10/2001 |
| DE | 10126437 | 12/2002 |

(Continued)

*Primary Examiner* — Justin Krause
*Assistant Examiner* — Gregory Prather
(74) *Attorney, Agent, or Firm* — Bachman & LaPointe, P.C.

(57) ABSTRACT

In the case of a gear shift fork (1) for the axial shifting of a clutch sleeve rotating around an axis in a gear box, which gear shift fork possesses two fork arm sections (4, 5) which lie opposite to each other and by their connection to each other are aligned and span an essentially semi-circular inner side (6), the fork arm sections (4, 5) and the forked interlock device section (3) shall possess a link structure.

8 Claims, 1 Drawing Sheet

(56) References Cited

FOREIGN PATENT DOCUMENTS

| DE | 10158729 | 6/2003 | | | |
|---|---|---|---|---|---|
| DE | 102005035529 | 2/2007 | | | |
| DE | 102005051378 | 5/2007 | | | |
| DE | 102005056205 | 6/2007 | | | |
| GB | 2382388 A | * | 5/2003 | ................ | B25F 5/00 |
| JP | 2003083448 | | 3/2003 | | |
| WO | WO2008/038276 | * | 4/2008 | ................ | A61F 2/24 |

* cited by examiner

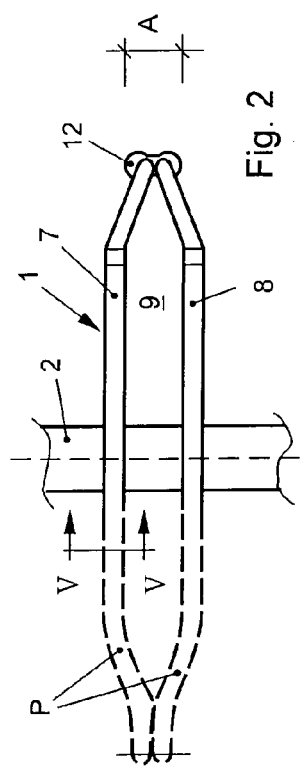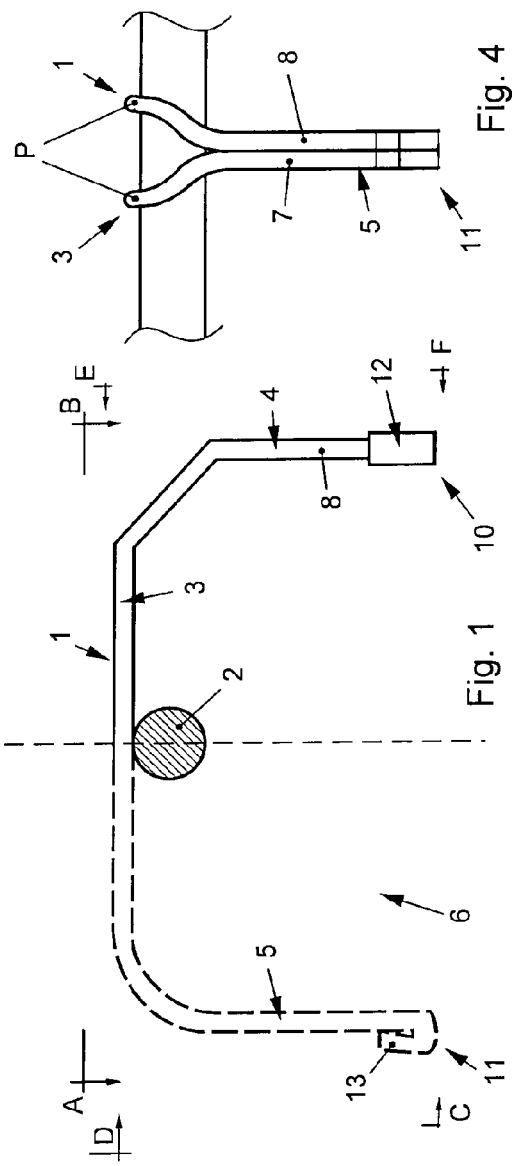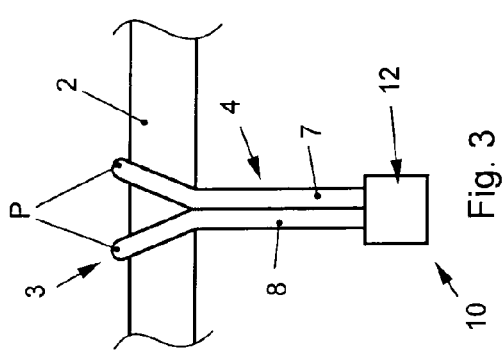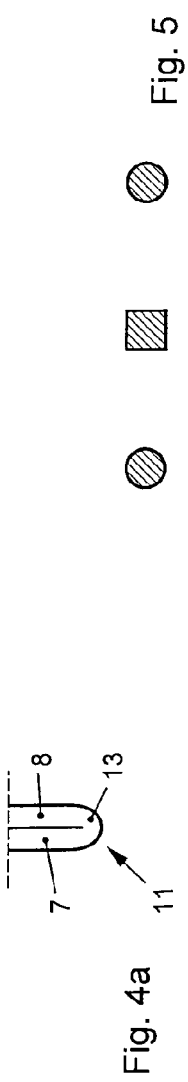

SHIFT FORK

BACKGROUND OF THE INVENTION

The invention pertains to a gear shift fork for the axial shifting of a clutch sleeve, which possesses two fork arm sections lying opposite to each other and which are connected via a section forming a forked interlock device section.

As state of the art technology, a whole variety of embodiments of gear shift forks are known and available on the market, the main use of which gear shift forks is in gear boxes, often in vehicles, to perform axial movements of clutch sleeves or the like.

Gear shift forks of this kind are usually manufactured from thin sheet metal elements, sheet metal strips, band elements or links.

One example of such a gear shift fork has been made known in patent document DE 101 58 729 A1, where it is provided to perform an axial shifting of a clutch sleeve rotating around an axis in a gear box, to which end the gear shift fork possesses two fork arm sections lying opposite to each other and which are connected via a section of a forked interlock device, in which instance the section of the forked interlock device connects the gear shift fork with a switching rod. The gear shift fork is essentially formed from a flat sheet of thin metal. To economize in terms of weight, recent designs of such gear shift forks now include openings in feasible areas of the gear shift fork, in particular in the fork arm sections. This post production reworking of the gear shift fork not only raises its costs, since corresponding devices and staff have to be provided for the punching of the pertaining openings, but it isn't very environmentally sound either. After all, the manufacturing of these gear shift forks produces waste in the form of punched material and also, a corresponding input of energy to perform the punching of the openings has to be provided.

The object of the invention is to provide a gear shift fork, which has especially little weight and nevertheless can be manufactured in a cost effective and environmentally sound manner.

SUMMARY OF THE INVENTION

The task underlying the invention is fulfilled by forming the fork arm sections and the forked interlock device section from a wire or a link.

This provides the advantage that the gear shift fork can be manufactured in an especially simple manner and also that it thus possesses an especially small weight. Since no post-production reworking processes, especially processes aimed at punching weight reducing openings, to name an example, need to be carried out, the damaging effects on the environment, such as waste and energy consumption, inherent in such processes can be avoided. The reason for such savings is that the corresponding manufacturing steps, such as punching, in a gear shift fork in accordance with the invention are no longer required, thus producing smaller amounts of waste.

Additionally, this especially light weight gear shift fork gives the advantage that vehicles in which this gear shift fork is employed consume less energy due to especially low weight design of the gear shift fork in accordance with the invention or that the corresponding weight reduction due to the gear shift fork can be utilized otherwise. For the same reason, vehicles with the gear shift fork in accordance with the invention can be environmentally friendlier in operation.

In addition, the utilization of a link structure makes it possible to provide a gear shift fork that, in comparison to a gear shift fork manufactured from thin sheet metal, is especially low weight.

The link structure can be formed by a link element which is multiply bended in such a manner that the gear shift fork is formed. This link element may be a single one or may comprise several parts. The advantage of the link element in comparison to thin metal sheets has less weight and, apart from corresponding bending processes, hardly requires any further reworking.

Advantageously, a second link element is positioned to correspond with the first link element, in which instance both link elements are distanced to each other in a forked interlock device section of the gear shift fork in such a manner that a passage opening is formed. Thus positioning the link elements in relation to each other provides the advantage that the link structure acquires a certain stiffening, thereby enabling the gear shift fork to perform its function of shifting rotating clutch sleeves.

The link elements thus utilized can, each one for itself or also only in unison, provide the required stiffness. Essential in this instance is merely that the link elements possess the required bending stress resistance, thus enabling one link element to find support in another link element, thereby providing further advantageousness in terms of the gear shift fork's bending stress resistance in this section. The link elements may, however, be positioned differently in section as well; for example, distanced in relation to each other, so that the passage opening is not closed, in which instance corresponding cross beams may be provided for stiffening, if required. These cross beams can also be provided inside the passage opening formed at the forked interlock device section.

In a preferred embodiment, the link structure is formed by one single piece of wire. This implies that the gear shift fork is formed by only one piece of wire which is bent in a manner corresponding to the form of the gear shift wire, the gear shift fork thus essentially comprising a semi-circle.

In an advantageous design of the gear shift fork, the section forming the transition between the forked interlock device section and the fork arm is bent at least once. However it is also possible that the transition is multiply bent, so that in the section forming the transition between the forked interlock device section and the fork arm there is a link element essentially extending linearly between the separate bends.

Advantageously, the fork arm end sections, in order to improve the meshing and disengaging of the gear shift fork with the corresponding clutch sleeves, equipped with advantaging devices such as a sliding shoe, for example. However, it is also possible that the fork arm end sections are formed in such a manner that the fork arm end section is bent, thus forming a glide eyelet, which performs the same function as the gliding shoes. The glide eyelet can also be equipped with friction reducing materials and/or another gliding shoe. In this instance it is only essential that the form of the fork arm end section does not impede a meshing and disengaging of the gear shift fork with the corresponding clutch sleeves, but supports these processes instead.

Advantageously, the guide disengaging element is bent away from the inner side of the gear shift fork, so that the inner side section is held free of protuberances. However it is also possible to bend the glide eyelet in any desired direction. In this instance it is only essential that the glide eyelet does not restrict the functioning of the gear shift fork.

In a preferred embodiment, the link elements of the link structure of the gear shift fork are formed from pieces of wire which possess an essentially circular cross section. The cross section of the link element, respectively of the pieces of wire, can, however, possess a square, hexagonal, or any other polygonal or circular cross section form. Only in this instance it is essential that the cross section provides the link element with the corresponding bending stress resistance required in order to perform the shift and push movements of the gear shift fork, especially in the fork arm section.

Advantageously, the gear shift fork is securely connected with a switching rod. The connection is preferably formed via a welded connection. However, it is also possible to position the gear shift fork in recesses within the switching rod and to rigidly connect these with each other by any suitable connecting method, such as, for example, welding, sticking or gluing and any other soluble connecting methods, such as, for example, screw connections.

BRIEF DESCRIPTION OF THE DRAWINGS

Further advantages, characteristics and details of the invention may be understood by referring to the description of preferred embodiments included in the following and to the drawing; said drawing shows in FIG. 1 a front view of a gear shift fork in accordance with the invention, which shift fork is positioned upon a switching rod, in which instance on each respective side of a symmetric half portion different embodiments of the gear shift fork in accordance with the invention are shown;

FIG. 2 a top view of the embodiments of the gear shift fork according to the view direction line A-B in FIG. 1;

FIG. 3 a side view of a first embodiment of the gear shift fork in accordance with the invention according to the view direction line E-F in FIG. 1;

FIG. 4 a side view of a second embodiment of the gear shift fork according to the view direction line D-C in FIG. 1;

FIG. 4a an alternative embodiment of a fork arm end section of the gear shift fork in accordance with the invention, and in FIG. 5 a possible cross section form of a link element of the gear shift fork in accordance with the invention according to sectional line V-V in FIG. 2.

DETAILED DESCRIPTION

As clearly to be understood from FIG. 1, a gear shift fork 1 in accordance with the invention is shown, which gear shift fork is securely positioned upon switching rod 2, preferably by welding. However, the connection between gear shift fork 1 and switching rod 2 may also be made by gluing or any other non-soluble or soluble connections.

In FIGS. 1 and 2, a symmetric axis is in each case indicated by a dotted line. On each respective side of the symmetric axis, an embodiment of the gear shift fork in accordance with the invention is in each case illustrated, once in perforated lines and once in continuous lines. Consequently, the separate embodiments may in each respective case be carried out in a mirror symmetric manner. However, it is also conceivable that the gear shift fork is formed in a manner similar to that illustrated in FIGS. 1 and 2, meaning in a non-symmetric manner.

The gear shift fork 1, which is illustrated on the right side of the symmetric axis (with continuous lines), possesses a multiply bent forked interlock device section 3. Adjacent to the forked interlock device section 3 there is a fork arm section 4. The fork arm section 4, at its fork arm end section 10 is equipped with a gliding shoe 12, which supports the meshing with the clutch sleeves not illustrated here. The fork arm section 5 at the end section 11 is formed with a glide eyelet 13.

As additionally to be seen in FIGS. 1 and 2, the gear shift fork 1 is comprised of wire or link elements 7, 8, which are distanced from each other within the forked interlock device section 3. The link elements 7 and 8 include in the top view, as illustrated in FIG. 2, a passage opening 9, which is essentially shaped like a honeycomb. The link elements 7, 8, while keeping a certain distance to each other, essentially run in parallel to each other and, upon reaching fork arm section 4 gain proximity to each other, until they finally are so adjacent to each other that the passage opening 9 is closed. It is thus implied that the link elements in this location are as aligned as possible. Preferably, the link elements 7, 8, in the fork arm section 4, are connected with each other via a welded seam. However, it is also possible to connect the link elements 7, 8 securely to each other by glued or pressed connection or by any other suitable connecting method.

In FIG. 3, the transition from fork arm section 3 towards the fork arm section 4 is illustrated in a side view according to the view direction line E-F, in which instance, additionally, also the fork arm end section 10, as in the first embodiment of the gear shift fork 1, is illustrated. The fork arm end section 10 is in this instance equipped with a gliding shoe 12. Ideally, the gliding shoe 12 is made of a synthetic material which aids a frictionless meshing of the fork arm end sections 10 with the respective clutch sleeve.

The fork arm end sections 11 of the link elements 7, 8 may however also be formed according to the alternative embodiment illustrated in FIGS. 4 and 4a. Therefore the design of the fork arm end section 11 is preferred in such cases where the link element 7 and the link element 8 are comprised of one single piece of wire, i.e. the gear shift fork 1 can be formed either by two separate pieces of wire, as indicated by the link elements 7 and 8, or the gear shift fork 1 can be comprised by one single, continuous piece of wire, in which instance connective spot of said gear shift fork lies within the region of a switching rod 2.

So, as seen in FIG. 4a, in case the link element 7, 8 is comprised of one single piece of wire, the fork arm end section 11 is essentially formed to possess a loop shape.

As already mentioned above, the gear shift fork is preferably manufactured from at least one piece of wire. In FIG. 5, possible cross section shapes of the piece of wire, respectively the link elements 7, 8, are illustrated. The possible cross section shapes can include shapes reaching from circular, square to polygonal, in which instance any shape wire cross section is conceivable, as long as it provides sufficient bending stress resistance and a corresponding pliability in the working process.

The invention claimed is:

1. A vehicle having a gear box with a gear shift fork for the axial shifting of a clutch sleeve in the gear box, the gear shift fork comprising a first wire link and a second wire link, wherein each wire link is a substantially U-shaped structure comprising a first fork arm section, a second fork arm section and an interlock device section connecting the first fork arm section and second fork arm section to form the substantially U-shaped structure, the first fork arm section, the second fork arm section and the interlock device section are formed of a single wire segment, wherein the wire segments of the interlock device section of each wire link are spaced apart and define a passage opening therebetween, and wherein the first and second fork arm sections of the first wire segment and the second wire segment are positioned to lie adjacent to each other and are connected to each other by a weld.

2. A vehicle according to claim 1, wherein the wire segments are formed from one piece of wire and are in each case two structural elements.

3. A vehicle according to claim 1, wherein at an end of one of the fork arm sections a gliding shoe is provided.

4. A vehicle according to claim 3, wherein the wires of one fork arm section are bent.

5. A vehicle according to claim 3, wherein at one end of the other of the bent fork arm the sections are bent to form a glide eyelet.

6. A vehicle according to claim 1, wherein the wire segments are one of circular and polygonal cross section.

7. A vehicle according to claim 1, wherein the wire segments are one of metal and plastic.

8. A vehicle according to claim 1, wherein the interlock device section is securely connected to a switching rod.

* * * * *